US012567524B1

(12) United States Patent
Hanna

(10) Patent No.: US 12,567,524 B1
(45) Date of Patent: Mar. 3, 2026

(54) FOLDABLE MAGNETIZED CABLES

(71) Applicant: Reaction Labs, LLC, Austin, TX (US)

(72) Inventor: John Nashed Hanna, Austin, TX (US)

(73) Assignee: Reaction Labs, LLC, Austin, TX (US)

( * ) Notice: Subject to any disclaimer, the term of this patent is extended or adjusted under 35 U.S.C. 154(b) by 0 days.

(21) Appl. No.: 19/050,860

(22) Filed: Feb. 11, 2025

Related U.S. Application Data

(60) Provisional application No. 63/705,812, filed on Oct. 10, 2024.

(51) Int. Cl.
*H01F 7/02* (2006.01)
*H01B 7/08* (2006.01)
*H01B 13/00* (2006.01)

(52) U.S. Cl.
CPC ................. *H01F 7/02* (2013.01); *H01B 7/08* (2013.01); *H01B 13/0016* (2013.01)

(58) Field of Classification Search
CPC .................................... H01B 7/08; H01B 7/40
See application file for complete search history.

(56) References Cited

U.S. PATENT DOCUMENTS 3,229,030 A 1/1966 Baermann
5,710,812 A 1/1998 Fogel
6,048,601 A 4/2000 Yahagi
6,225,556 B1 5/2001 Saito
6,707,361 B2 3/2004 Blume
7,202,416 B2 4/2007 Komuro
7,342,172 B1 3/2008 Wang et al.
7,692,099 B2 4/2010 Burke
11,011,284 B1 5/2021 Li
11,756,703 B1 9/2023 Yue
11,929,191 B1 3/2024 Yue
2004/0055772 A1 3/2004 Tsutsui et al.
2009/0314515 A1* 12/2009 Bevirt ...................... H01B 7/40
174/110 R
2011/0308835 A1 12/2011 Piekny
2015/0170798 A1* 6/2015 Chen ...................... H01B 3/002
174/113 R (Continued)

FOREIGN PATENT DOCUMENTS

CN 102416685 B 12/2013
CN 203673868 U 6/2014

(Continued)

*Primary Examiner* — Timothy J Thompson
*Assistant Examiner* — Amol H Patel
(74) *Attorney, Agent, or Firm* — Jackson Walker L.L.P.

(57) ABSTRACT

A foldable magnetized cable (FMC) includes two or more segments or folds and produces a persistent magnetic field that aids in aligning and maintaining alignment of the folds during folding for storage or transport. The magnetic field is sufficiently strong to maintain the FMC in a folded state, but not strong enough to prevent a user from easily unfolding the FMC manually. The FMC may include a foldable elongated flexible magnetic component (EFMC) including two or more folds and one or more electrically conductive wires within or adjacent to the foldable EFMC. The foldable EFMC may include a pliable polymer compounded with magnetic particles of iron, neodymium, ferrite, cobalt, nickel, or the like. The foldable EFMC may be exposed to a magnetic field of sufficient magnitude and duration to produce a permanent magnet.

16 Claims, 4 Drawing Sheets

(56) References Cited

U.S. PATENT DOCUMENTS

| | | | | |
|---|---|---|---|---|
| 2015/0187468 | A1* | 7/2015 | Kulas | H01B 13/0016 29/825 |
| 2016/0293295 | A1 | 10/2016 | Huang et al. | |
| 2016/0295754 | A1 | 10/2016 | Huang et al. | |
| 2019/0083192 | A1 | 3/2019 | Spindler | |
| 2020/0161731 | A1 | 5/2020 | Himi et al. | |
| 2021/0074450 | A1 | 3/2021 | Harris, Sr. | |

FOREIGN PATENT DOCUMENTS

| | | | |
|---|---|---|---|
| CN | 205882348 | U | 1/2017 |
| CN | 106711725 | A | 5/2017 |
| CN | 106711728 | A | 5/2017 |
| CN | 206532997 | U | 9/2017 |
| CN | 207925840 | U | 9/2018 |
| CN | 207925846 | U | 9/2018 |
| CN | 211655236 | U | 10/2020 |
| CN | 212392445 | U | 1/2021 |
| CN | 213717212 | U | 7/2021 |
| CN | 113674921 | A | 11/2021 |
| CN | 215643841 | U | 1/2022 |
| CN | 216053973 | U | 3/2022 |
| CN | 216750587 | U | 6/2022 |
| CN | 217036223 | U | 7/2022 |
| CN | 115352012 | A | 11/2022 |
| CN | 218569455 | U | 3/2023 |
| WO | 2005083724 | A1 | 9/2005 |

* cited by examiner

FOLDABLE MAGNETIZED CABLES

CROSS REFERENCE

This application claims the benefit of U.S. App. Ser. No. 63/705,812, filed Oct. 10, 2024, which is incorporated by reference herein in its entirety.

FIELD OF INVENTION

This invention is in the field of electrical cables and, more specifically, power and/or data cables for electronic devices.

DESCRIPTION OF RELATED ART

Electronic devices such as laptop computers, smartphones, etc. often use cables for input and output of power, data, audio, etc. When not in use, such cables frequently become entangled, causing frustration for the user. A cable featuring an elongated and flexible magnetic component (EFMC) for improved cable manageability is disclosed in U.S. Pat. No. 11,972,881, entitled Magnetized Cables for Improved Cable Management, issued Apr. 30, 2024 (the "'881 Patent").

SUMMARY

In at least one aspect, subject matter included herein discloses a foldable magnetized cable (FMC) and a method for manufacturing such cables. Disclosed foldable magnetized cables include a foldable EFMC and one or more electrically conductive wires, any one or more of which may be embedded within the foldable EFMC or positioned in close proximity to the foldable EFMC. Foldable EFMCs may include two or more segments, generally referred to herein as folds, including a first fold and a second fold adjacent to the first fold, wherein the two folds can be manually manipulated into a folded state in which a surface of the first fold is in contact with or in very close proximity to a surface of the second fold. Additionally, the foldable EFMC may be configured to produce a persistent magnetic field that assists in maintaining the two folds in the folded state until the folds are manually or otherwise separated from one another. In this regard, the persistent magnetic field may be characterized as a relatively weak magnetic field that has a magnitude sufficient to maintain the cable in the folded state when no external force is applied, but wherein the magnitude is low enough such that the folded state can be manually and easily undone by an owner or user of the cable.

A complexity of the persistent magnetic field produced by the foldable EFMC may vary among different implementations. In at least one implementation, each of one or more folds may produce a magnetic field analogous to the magnetic field of a bar magnet. For example, each fold may include a pair of substantially parallel major surfaces wherein a first major surfaces corresponds to a north pole of a permanent magnet and the second major surface constitutes the south pole, or vice versa. In some embodiments the magnetic polarity of each fold may be opposite the magnetic polarity of an adjacent fold such that the magnetic polarities of the folds in a flexible magnetized cable may include any combination of N-folds and S-folds wherein the magnetic polarity of an N-fold differs by 180 degrees from the magnetic polarity of an S-fold. Representative patterns of N and S-folds may include repeating patterns such as NS, NNSS, SNSN, and so forth. Many other arrangements of poles would provide the same effect, including for example NS, NSNS, NSNSN, etc.

Each fold in a foldable EFMC may have a cross-section that is rectangular or rectangular-like, featuring a pair of substantially planar and parallel major surfaces. A first major surface of a first segment may correspond to a north pole while the second major surface corresponds to a south pole.

In at least some embodiments, the foldable EFMC is magnetized such that it produces produce a persistent magnetic field wherein at least some portions of the foldable EFMC are magnetically attracted to at least some other portions of the foldable EFMC when the magnetized cable is folded. The foldable EFMC may include a pliable polymer binder and magnetic particles distributed within the pliable polymer binder. The FMC cable may have a substantially rectangular cross-section defining a pair of substantially planar and parallel major surfaces.

Disclosed FMCs may include alternating stiff sections and flexible sections wherein a rigidity of a stiff section is greater than a rigidity of a flexible section. The flexible sections are capable of acting as predefined hinge points while the stiff sections define the distance between hinge points. One or more of the stiff sections incorporate one or more polymeric sheets to add stiffness in specific sections. One or more of the flexible sections may be perforated, slit, or punched to improve flexibility. The FMC may include an exterior sheath comprising a stretchable yarn. A lubricant between one or more internal mating surfaces may be included.

In one aspect, disclosed FMCs incorporate electrically conductive wires within or adjacent to a foldable EFMC. The electrically conductive wires may include embedded wires and/or adjacent wires, which are not embedded in the foldable EFMC. The foldable EFMC material may be a polymer compounded or mixed with magnetic powder. Other beneficial additives and materials may also be included. The magnetic powder may be a power of Neodymium Iron Boron, Samarium Iron Nitrogen, a mixture of the two, or of any other magnetic material.

Disclosed FMCs may incorporate an a foldable EFMC configured to produce a persistent magnetic field wherein at least some portions of the magnetized cable are magnetically attracted to at least some other portions of the magnetized cable when the magnetized cable is folded. A foldable EFMC may include a pliable polymer binder and magnetic particles distributed within the pliable polymer binder. In at least some embodiments referred to herein as foldable embodiments, the foldable EFMC is implemented as a foldable EFMC that can be easily and reversibly manipulated between at least two static configurations including an extended configuration and a folded configuration. At least some foldable embodiments can additionally accommodate one or more partially extended configurations. A foldable EFMCs may include two or more EFMC segments in which a first EFMC segment overlaps a second EFMC segment and the two segments occupy substantially parallel, closely spaced planes. In at least some foldable embodiments, a major surface of the first segment may contact or lie in very close proximity to a major surface of the second surface such that there is little or no displacement between the major surfaces. In this manner, foldable embodiments have a variable length footprint wherein the length of the foot print is reduced in proportion to the number and length of overlapping segments.

Disclosed herein, for example, is a magnetized cable comprising: one or more electrically conductive wires and a foldable EFMC configured to produce a persistent magnetic field wherein at least some portions of the magnetized cable are magnetically attracted to at least some other portions of the magnetized cable when the magnetized cable is folded, wherein the foldable EFMC includes a pliable polymer binder and magnetic particles distributed within the pliable polymer binder; the magnetic cable has a substantially rectangular cross-section defining a pair of substantially planar and parallel major surfaces.

Further disclosed herein, for example, is a method of manufacturing a magnetized cable, comprising forming a foldable EFMC, exposing the foldable EFMC to a magnetic field of sufficient strength to create a persistent magnetic field wherein the persistent magnetic field is oriented wherein at least some portion of the foldable EFMC is magnetically attracted to at least some other portion of the foldable EFMC when the magnetized cable is folded, and incorporating one or more electrically conductive wires within or adjacent to the foldable EFMC.

Further disclosed herein, for example, is a method of manufacturing an FMC, comprising compounding a polymer and magnetic particles to form a foldable EFMC, cutting the foldable EFMC to the desired length, applying a strong magnetic field to magnetize the foldable EFMC, and installing connectors at each end.

BRIEF DESCRIPTION OF THE DRAWINGS

The drawings included herewith provide illustrative and representative examples of patentable subject matter disclosed herein, including processes, articles of manufacture, and compositions of matter, whether referred to as such or by other terms such as devices, systems, combinations, methods, materials, and the like FIG. 1 is a perspective view of an FMC in a folded state.

DETAILED DESCRIPTION

Figure 1:
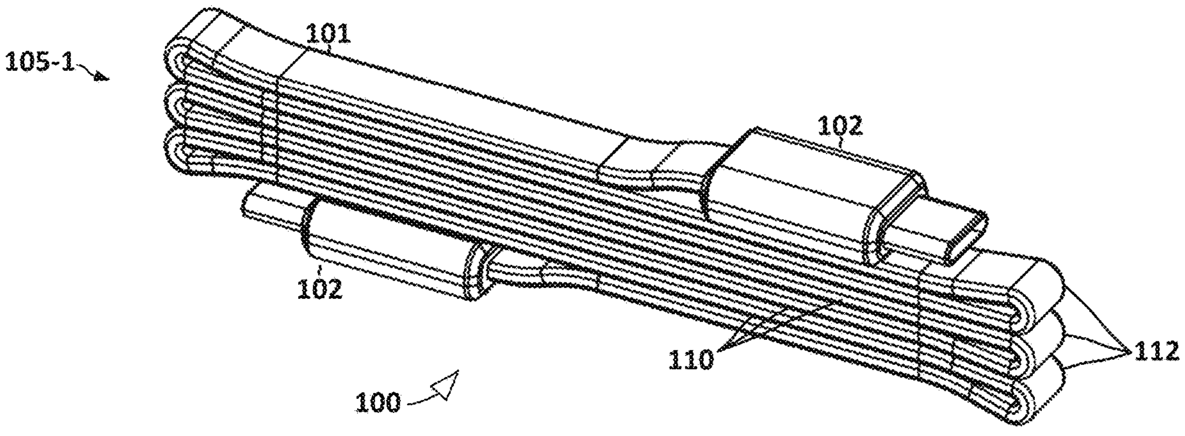

Representative examples and features of foldable magnetized cables are illustrated in the drawings. FIG. 1 illustrates a perspective view of an exemplary foldable magnetic cable 100 in a position, configuration, or state referred to herein as a folded state 105-1, which may also be referred to as the fully-folded state. The FMC 100 depicted in FIG. 1 includes a foldable EFMC 101 connected at either end to a connector 102. In at least some embodiments, FMC 100, including foldable EFMC 101 and connectors 102, comply with one or more mechanical and electrical specifications of at least one industry standard for conveying data and/or power to and/or from an electronic device including, as representative examples, a smart phone, desktop or laptop computer, tablet device, headphone and other audio device, display device, gaming console, digital camera etc. In at least some embodiments, FMC 100 is a Universal Serial Bus (USB) certified cable providing a data/power transport in compliance with one or more USB standards. In USB Type-C embodiments, as a representative example, one or both connectors 102 are USB Type-C connectors.

The foldable EFMC 101 depicted in FIG. 1 includes a plurality of folds 110 and a plurality of elbow portions, referred to herein simply as elbows 112. In some embodiments, folds 110 and elbows 112 comprise portions of a continuous component. In other embodiments, folds 110 and elbows 112 may be distinct components that are connected together. Each of the elbows 112 depicted in FIG. 1 is coupled between two folds 110, which may be referred to herein as adjoining folds, adjacent folds, consecutive folds or another suitably descriptive term. in a folded state such as the folded state 105-1 depicted in FIG. 1, all or some portion of a surface of at least one fold 110 is in contact with or substantially in contact with at least some portion of a surface of a different fold 110. Additionally, to address any inherent mechanical bias, tendency, or preference to un-fold that FMC 100 may have, FMC 100 produces a persistent magnetic field that includes one or more magnetic force components that overcome the inherent unfolding tendency of FMC 100 and thereby maintain FMC 100 in folded state 103. As an illustrative example suitable for the foldable EFMC 101 of FIG. 1, in which each fold 110 has a right cuboid form factor defining two major surfaces, each fold 110 may be fabricated as a permanent magnet in which the two major surfaces of fold 110 correspond to the magnet's north and south poles respectively. In at least some embodiments, the magnitude of the persistent magnetic field is kept below a predetermined maximum threshold to prevent the persistent magnetic field from making it difficult for a user to unfold FMC 100 with manual force.

Figure 2:
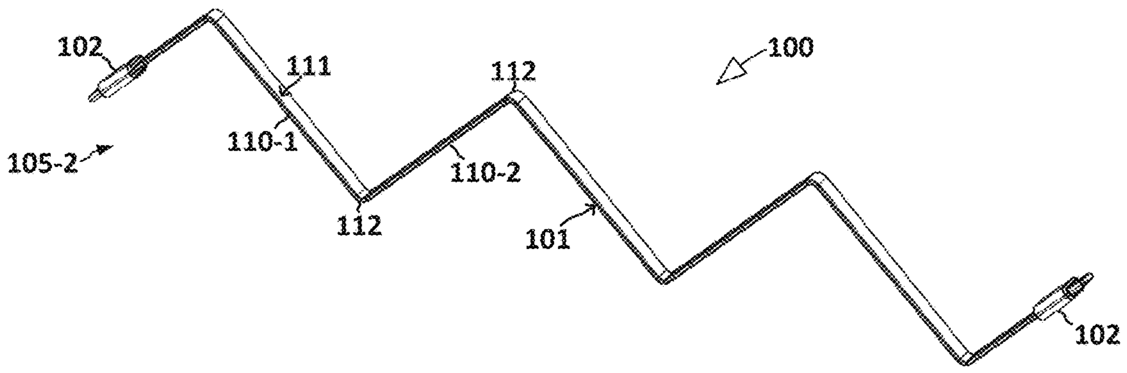
FIG. 2 illustrates an FMC in a partially unfolded state.

Referring now to FIG. 2, FMC 100 is depicted in an unfolded state 105-2. In the unfolded state 105-2 depicted in FIG. 4, major surfaces of folds 110, such as major surface 111 of first fold 110-1, are not in contact with or in close proximity to major surfaces of other folds 110, including the major surfaces of an adjoining fold 110-2. In at least some embodiments, the unfolded state 105-2 depicted in FIG. 2 represents a state capable of persisting until an external force, such as the manual force of a user, is applied to FMC 100 to transition FMC 100 to another state such as the folded state 105-1 of FIG. 1 or a fully-unfolded state (not depicted) in which a profile of FMC 100 approximates a straight line. In such embodiments, the unfolded state 105-2 depicted in FIG. 2 demonstrates that the persistent magnetic field of foldable EFMC 101 is not sufficiently strong to transition FMC 100 from unfolded state 105-2 to fully folded state 105-1 depicted in FIG. 1. In a fully-unfolded state, FMC 100 may be substantially straight, without obvious accordion-like folds. In this state, FMC 100 may be largely indistinguishable from conventional electronics cable. Although the folding depicted in FIG. 1 and FIG. 2 is representative, implementation of FMC 100 that, for the sake of clarity and brevity, are not depicted herein may fold in a different manner.

Figure 3:
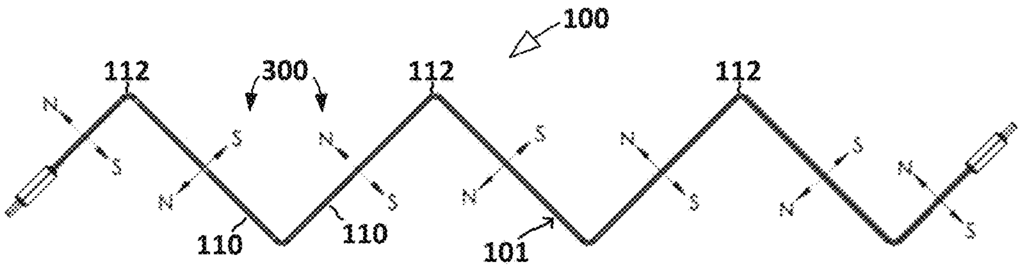
FIG. 3 is side view of an FMC in a partially unfolded state.

FIG. 3 illustrates a representative FMC 100 in which the folds 110 are less flexible than elbows 112. In at least some such embodiments, the flexibility of at least some folds 110 may be characterized as rigid, semi-rigid, stiff, or another suitable descriptive term. In such embodiments, foldable EFMC 101 may be comprised of alternating stiff sections (folds 110) and flexible sections (elbows 112), wherein elbows 112 act as predefined hinge points while folds 110 define the distance between successive elbows 112. In at least one embodiment exhibiting desirable folding characteristics, folds 110 have a Modulus of Elasticity that is at least 2 times the Modulus of Elasticity of elbows 112.

In some embodiments, a rigidity of folds 110 may be increased by adding material to the fold. As a representative example, one or more folds 110 may include a polymeric sheet may be adhered to the underlying EFMC to selectively increase rigidity in desired portions of foldable EFMC 101. In embodiments of FMC 100 that incorporate a sheath, one or more polymeric sheets may be adhered to the exterior of the sheath in desired portions of FMC 100. Ribs or other structural features may be utilized in addition to or in lieu of polymeric sheets to selectively increase rigidity. The polymeric sheets and structural features described herein are representative rather than exhaustive approaches for achieving desired rigidity profiles within FMC 100, and those of ordinary cable design skill will appreciate that other methods to selectively control rigidity and achieve a desirable rigidity profile can be utilized. Conversely, the rigidity of one or more portions of FMC 100 may be selectively increased. As an illustrative example, portions of foldable EFMC 101, and/or a sheath enclosing the foldable EFMC, may be perforated, slit, or punched to create additional flexibility, but it will be readily appreciated that other techniques for increasing the flexibility of a section of material can be utilized.

If elbows 112 and/or other flexible sections of FMC 100 are too rigid, the magnetic provided the persistent magnetic field may be insufficient to FMC 100 in the folded state 105-1 depicted in FIG. 1. Conversely, the desirable effect of the magnetic attraction may be improved by improving the flexibility of the flexible sections. in at least some embodiments, flexible sections of FMC 100 are fabricated to be as flexible as practicable consistent with reliability, performance, and cost considerations.

FIG. 3 also depicts a representative persistent magnetic field 300 produced by foldable EFMC 101. The persistent magnetic field 300 depicted in FIG. 3 includes a magnetic field component corresponding to each fold 110 wherein each component 110 approximates a permanent magnet represented in FIG. 3 by north (N) and south(S) magnetic poles located on the opposing major surfaces 111 of each fold 110. Additionally, the orientation of the magnetic field components shown in FIG. 3 alternates with each successive fold 110. In this configuration, a north pole of each fold 110 contacts or lies in close proximity to a south pole of an adjoining fold 110 when FMC 100 is in fully-folded state 105-1 of FIG. 1. The close proximity of the N and S poles creates the magnetic force that retains FMC 100 in folded state 105-1 of FIG. 1.

Figure 4:
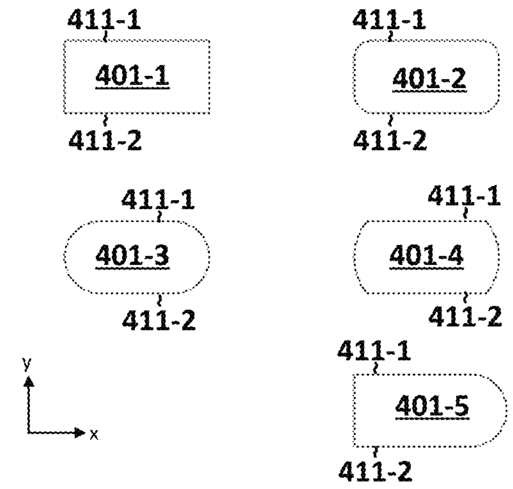
FIG. 4 depicts various representative FMC cross-sections.

Referring now to FIG. 4, varies representative cross-sections 401 of folds 110 are depicted along with an x-y coordinate axis shown for orientation purposes. In the depicted orientation the x-axis dimension may be referred to as the width and the y-axis dimension may be referred to as the height. A z-axis, not depicted in FIG. 4, corresponds to the elongated dimension of each fold 110.

The representative cross-sections illustrated in FIG. 4 include a rectangular cross-section 401-1, a rectangular with rounded corners cross-section 401-2, elongated oval cross-sections 401-3, a rectangular with semi-circular ends cross-section 401-4, and a rectangular with one semicircular end cross-section 401-5. Each cross-section 401 defines a pair of substantially planar major surfaces 411-1 and 411-2, displaced from one another by the cross-sectional height. The major surfaces 411 of FIG. 4 may correspond to the major surfaces 111 of FIG. 2 (only one of which is visible in the view of FIG. 2). Each of the cross-sections 401 illustrated in FIG. 4 is substantially symmetric about the x-axis and has a width that is greater than its height. In addition, with the exception of cross-section 401-5, each cross-section 401 is substantially symmetric about the y axis. Other cross-sections, such as round cross-section, may also be utilized.

Figure 5:
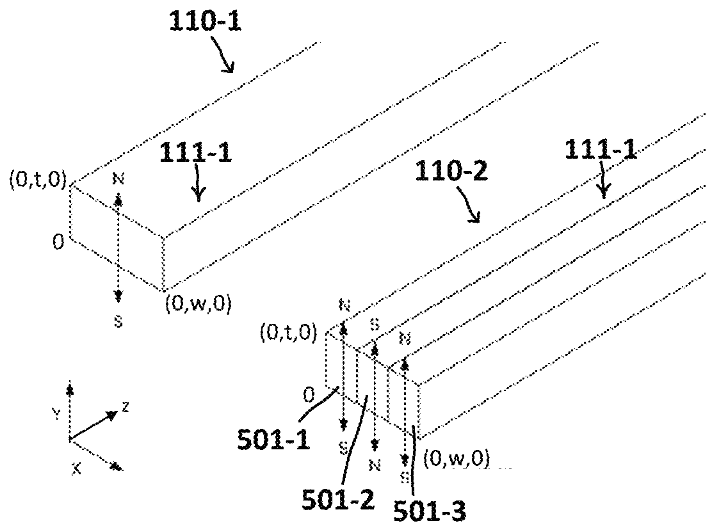
FIG. 5 depicts single-pole and multi-pole FMC implementations.

FIG. 5 depicts isolation views of two representative folds 110. Each fold 110 depicted in FIG. 5 is implemented as an elongated right cuboid defining a substantially parallel pair of major surfaces 111 lying in x-z planes of the 3-dimensional Cartesian coordinate system suggested by the depicted set of x-y-z axes. The major surfaces 111 of FIG. 5 include an upper major surface 111-1 positioned at y=t and a lower major surface (not visible in FIG. 5) at y=0.

First fold 110-1 is representative of simple magnetization in which the N pole of an equivalent bar magnet occupies the entire upper major surface 111-1 of fold 110-1 and the S pole of the equivalent bar magnet occupies the enter lower surface of fold 110-1. In the simple magnetic configuration of fold 110-1 may be described as a single pole major surface Second fold 110-2 is a representative example of more complex magnetization that includes three distinct magnetized subcomponents 501, each of which occupies its own portion of the fold's width (w). Each magnetized subcomponent 501 illustrated in FIG. 5 has a simple magnetization. Additionally, however, the magnetized subcomponents 501 are arranged in an alternating orientation in which the magnetic orientations of first and third magnetized subcomponents 501-1 and 5-501-3 are opposite the magnetic orientation of second magnetized subcomponent 501-2. The configuration of fold 110-2 as depicted in FIG. 5 may be described as an alternating configuration or, more specifically to the depicted implementation, an NSN configuration reflecting the varying orientations of the magnetized subcomponents 501. Alternating magnetic configurations such as the configuration of fold 110-2 beneficially facilitate x-dimension alignment of adjoining folds 110-2 when the FMC 100 is in the folded position due to the alignment of the magnetized subcomponents 501 of adjoining folds. Although an NSN alternating configuration is depicted in FIG. 5, magnetized subcomponents 501 can be arranged in any practicable sequence of N-oriented and S-oriented magnetized subcomponents.

One method to improve the flexibility of the flexible sections may be to use a braided textile sheath. Use of stretchable yarns may greatly enhance the resulting flexibility of the cable, for example when using a braided textile sheath. Such stretchable yarns may include latex, spandex, elastane, or other stretchable yarn materials.

Another factor that may affect the flexibility of a cable may be friction within a cable, which may reduce the flexibility of the cable. Friction exists between all elements used to construct the cable, including the wires, wire insulation, EFMC, and the sheath.

The use of lubricants between all internal mating surfaces may enhance the resulting flexibility of the cable. These internal mating surfaces exist between every component of the cable construction. For instance: between the insulation of neighboring wires, between the sheath and the foldable EFMC, between the foldable EFMC and the wires, and any other adjacent components.

Dry lubricants such as corn starch, talc, graphite, molybdenum disulfide, PTFE, and others may be especially useful. Other lubricants may also be used.

Another factor that may affect the flexibility of a cable may be friction on the exterior of the cable. Friction on the exterior of the cable sheath may make it difficult for adjacent portions to slide when necessary. The use of a polymer with a low co-efficient of friction is desirable. In one exemplary embodiment, the coefficient of friction may be less than 0.15. Some possible polymers may include PTFE, PP, PE, PVC and others. For braided textile sheaths, waxed yarn may be used to reduce friction.

Another factor that may affect the flexibility of a cable is wire selection. To maximize the flexibility of the flexible sections, the durometer (hardness) of wire insulation may be kept as low as possible. In one exemplary embodiment, the durometer of the wire insulation may be equal to or less than 65 P. Similarly, the size of copper stranding may be as small as practicable. In one exemplary embodiment, the copper stranding may be less than 0.05 mm in diameter.

Figure 6:
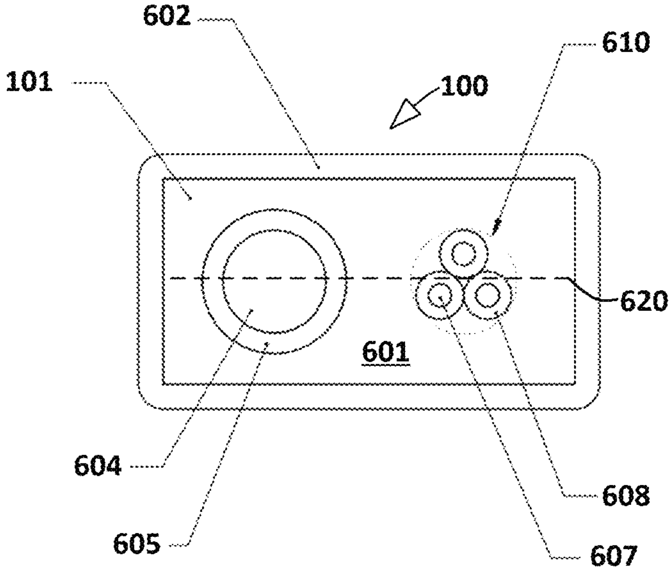
FIG. 6 is a cross-sectional view of an embedded-wire FMC.
Figure 7:
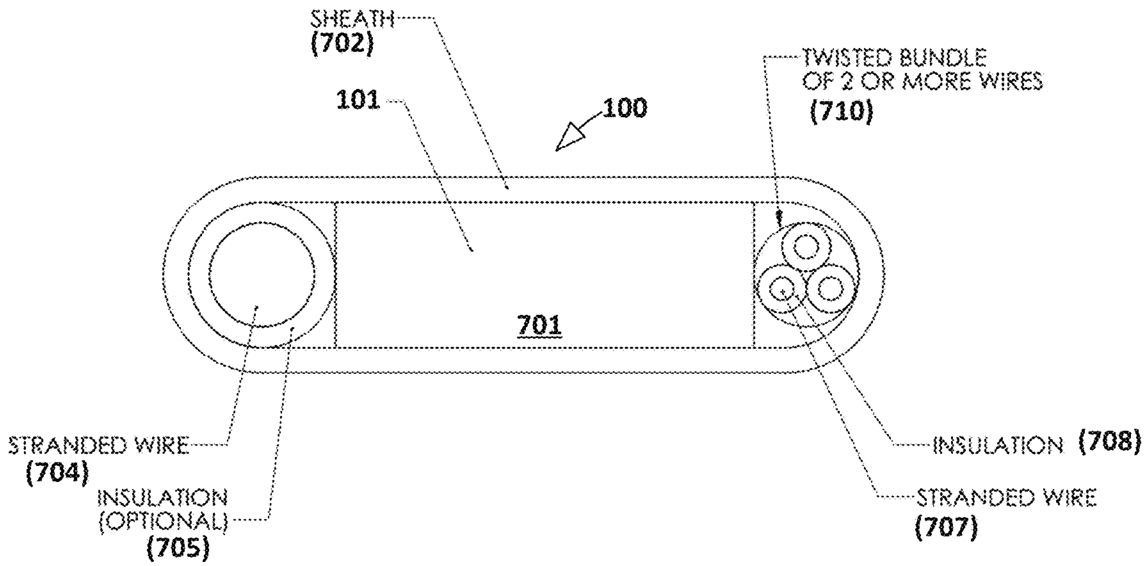
FIG. 7 is a cross-sectional view of an adjacent-wire FMC.

FIGS. 6 and 7 illustrate cross sections for a representative embedded-wire configuration 601 of and a representative adjacent-wire configuration 701 of FMC 100 and/or foldable EFMC 101. Embedded-wire configurations include one or more electrically conductive wires, either with or without optional insulation, embedded in foldable EFMC 101 while adjacent-wire configurations include one or more electrically conductive wires routed or otherwise positioned adjacent to, but not embed in foldable EFMC 101. The two configurations are not mutually exclusive and embodiments may include one or more embedded wires and one or more adjacent wires.

The embedded-wire configuration 601 of FMC 100 depicted in FIG. 6 includes an outer sheath (602) containing or otherwise encompassing foldable EFMC 101 and one or more stranded or solid wires (604) optionally surrounded by electrical insulation (605). The depicted foldable EFMC 101 additionally includes one or more embedded twisted bundles 610 including two or more twisted bundle wires, each of which includes a stranded or solid wire 607 optionally surrounded by electrical insulation 608. In at least some embodiments, Central axes of stranded or solid wires 604 and/or embedded twisted bundles 610 may be vertically aligned with a central plane 620 of foldable EFMC 101.

The adjacent-wire configuration 701 depicted in FIG. 7 includes one or more adjacent wires including one or more stranded or solid wires 704 and/or one or more adjacent wire bundles 710 routed alongside foldable EFMC 101 and enclosed within a surrounding sheath 702. Each stranded or solid wire 704 may be insulated with optional insulation 705 while each stranded or solid wire 707 within a twisted bundle 710 may be insulated with optional insulation 708.

The exemplary wire arrangements shown in FIGS. 6 and 7 can be combined. For instance, a foldable EFMC (not depicted) may include an embedded stranded or solid wire 604 and/or an embedded twisted bundle 610, as in FIG. 6, as well as an adjacent stranded or solid wire 704 and/or an adjacent twisted bundle 710, as in FIG. 7.

Figure 8:
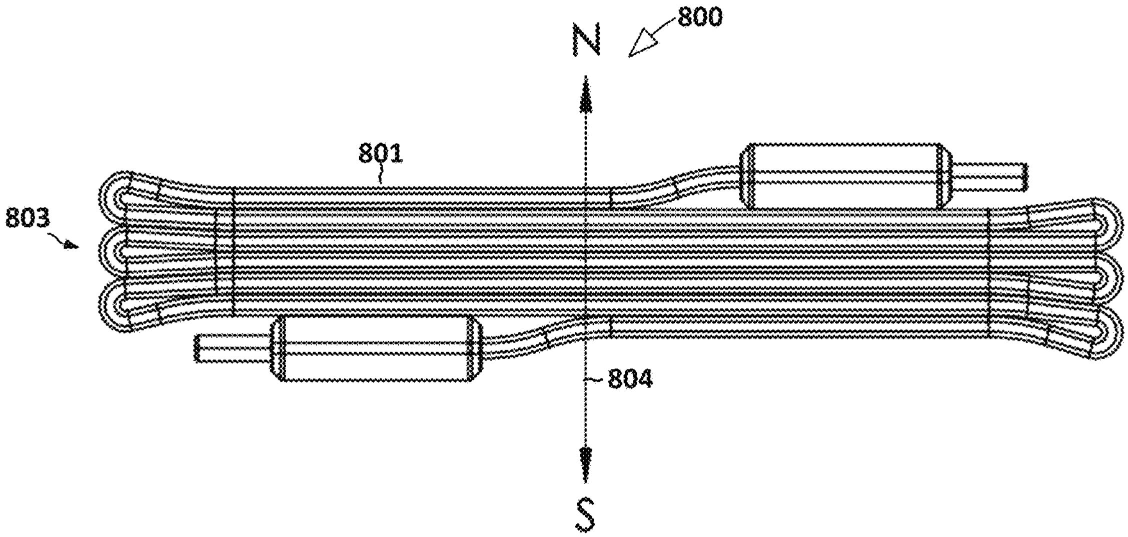
FIG. 8 depicts a magnetization of an FMC.

FIG. 8 illustrates a process or method 800 for magnetizing a foldable elongated component, referred to herein as an EFMC precursor or, more simply, precursor 801, to produce a foldable EFMC and/or an FMC. As depicted in FIG. 8, precursor 801 may be magnetized by arranging precursor 801 in a folded state 803 before exposing precursor 801 cable to a magnetic field 804 of sufficient magnitude for a duration sufficient to create a permanent magnet that produces a persistent magnetic field. Folding of precursor 801 prior to magnetization beneficially results in auto-creation of alternating magnetic polarities in adjoining folds of precursor 801.

The manufacture of a foldable EFMC 101 and/or an FMC 100 may include one or more heat treatment operations to impart a desired shape to the foldable EFMC 101 and/or the FMC 100. In a representative heat treatment, the precursor may be arranged in a desired shaped or state and heated for 30 minutes at 90 C, but the duration and heat are design alternatives and other processes may employ different durations and/or different temperatures. When unfolded at the completion of the heat treatment, the cable may have a preference, bias, and/or tendency to return to the folded state, helping the user to store it more easily. Other manners of folding are possible, and heat treatment can similarly be used to imprint a manner of folding for the cable.

In one exemplary embodiment, heat treatment of a foldable EFMC containing chlorinated polyethylene has been proven effective. Other polymers may also be suitable. In one exemplary embodiment, wires insulated with PVC, PP, and PE may hold their shape well after heat treatment.

Figure 9:
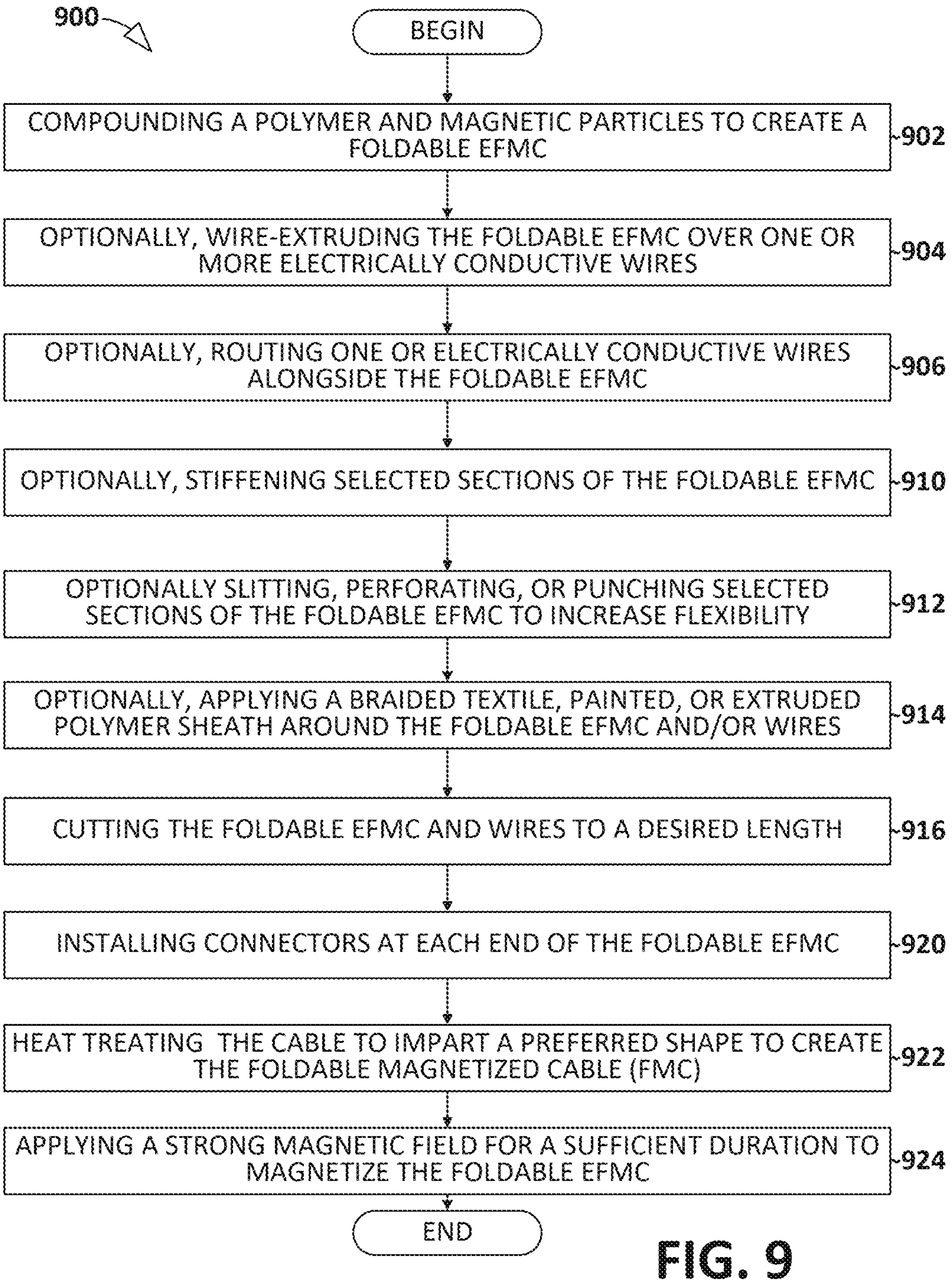
FIG. 9 depicts a flow diagram of an exemplary method for manufacturing an FMC.

FIG. 9 is a flow diagram depiction of a representative method 900 for manufacturing disclosed cables and/or cable components. The illustrated method 900 may include some or all of the following steps. compounding (902) a polymer and magnetic particles to create a foldable EFMC; optionally wire-extruding (904) the foldable EFMC over one or more electrically conductive wires; optionally routing (906) wires alongside the foldable EFMC; optionally stiffening (910) selected sections of the foldable EFMC; optionally slitting, perforating, or punching (912) selected sections of the foldable EFMC to increase flexibility; optionally, applying (914) a braided textile, painted, or extruded polymer sheath around the foldable EFMC and/or wires; cutting (916) the foldable EFMC and wires to a desired length and installing (920) connectors at each end; optionally heat treating (922) the cable to impart a preferred shape; and applying (924) a strong magnetic field to magnetize the foldable EFMC. In one exemplary embodiment, a strong magnetic field may constitute a magnetic flux density greater than 5 T.

What is claimed is:

1. A foldable magnetized cable (FMC), comprising:
a foldable elongated flexible magnetized component (EFMC) configured to produce a persistent magnetic field wherein at least some portions of the foldable EFMC are magnetically attracted to at least some other portions of the foldable EFMC when the foldable EFMC is in a folded state, wherein:
the foldable EFMC includes a pliable polymer binder and magnetic particles distributed within the pliable polymer binder to produce multiple magnetic poles;
the foldable EFMC has a substantially rectangular cross-section defining a pair of substantially planar and parallel major surfaces wherein the substantially rectangular cross-section is substantially symmetric about an x-axis and a y-axis, and longer in the x-axis than it is in the y-axis wherein the multiple magnetic poles are substantially parallel with the y-axis and arranged in an alternating configuration; and
one or more electrically conductive wires.

2. The FMC of claim 1, wherein the multiple magnetic poles facilitate y-axis alignment when the FMC is in the folded state.

3. The FMC of claim 1, wherein:
the FMC comprises one or more stiff sections and one or more flexible sections;
the flexible sections provide predefined hinge points; and
the stiff sections define a distance between the predefined hinge points.

4. The FMC of claim 1, wherein one or more of the electrically conductive wires are not embedded in the foldable EFMC.

5. A foldable magnetized cable (FMC), comprising:
a foldable elongated flexible magnetized component (EFMC) configured to produce a persistent magnetic field wherein at least some portions of the foldable EFMC are magnetically attracted to at least some other portions of the foldable EFMC when the foldable EFMC is in a folded state, wherein:
the foldable EFMC includes a pliable polymer binder and magnetic particles distributed within the pliable polymer binder;
the foldable EFMC has a substantially rectangular cross-section defining a pair of substantially planar and parallel major surfaces; and
one or more electrically conductive wires;
wherein:
the FMC comprises one or more stiff sections and one or more flexible sections;
the flexible sections provide predefined hinge points; and
the stiff sections define a distance between the predefined hinge points;
wherein one or more of the stiff sections incorporate one or more polymeric sheets to add stiffness in specific sections.

6. A foldable magnetized cable (FMC), comprising:
a foldable elongated flexible magnetized component (EFMC) configured to produce a persistent magnetic field wherein at least some portions of the foldable EFMC are magnetically attracted to at least some other portions of the foldable EFMC when the foldable EFMC is in a folded state, wherein:
the foldable EFMC includes a pliable polymer binder and magnetic particles distributed within the pliable polymer binder;
the foldable EFMC has a substantially rectangular cross-section defining a pair of substantially planar and parallel major surfaces; and
one or more electrically conductive wires;
wherein:
the FMC comprises one or more stiff sections and one or more flexible sections;
the flexible sections provide predefined hinge points; and
the stiff sections define a distance between the predefined hinge points;
wherein one or more of the flexible sections are perforated, slit, or punched to create flexibility.

7. A foldable magnetized cable (FMC), comprising:
a foldable elongated flexible magnetized component (EFMC) configured to produce a persistent magnetic field wherein at least some portions of the foldable EFMC are magnetically attracted to at least some other portions of the foldable EFMC when the foldable EFMC is in a folded state, wherein:
the foldable EFMC includes a pliable polymer binder and magnetic particles distributed within the pliable polymer binder;
the foldable EFMC has a substantially rectangular cross-section defining a pair of substantially planar and parallel major surfaces;
one or more electrically conductive wires; and
an exterior sheath comprising a stretchable yarn.

8. A foldable magnetized cable (FMC), comprising:
a foldable elongated flexible magnetized component (EFMC) configured to produce a persistent magnetic field wherein at least some portions of the foldable EFMC are magnetically attracted to at least some other portions of the foldable EFMC when the foldable EFMC is in a folded state, wherein:
the foldable EFMC includes a pliable polymer binder and magnetic particles distributed within the pliable polymer binder;
the foldable EFMC has a substantially rectangular cross-section defining a pair of substantially planar and parallel major surfaces;
one or more electrically conductive wires; and
a lubricant between one or more internal mating surfaces.

9. A foldable magnetized cable (FMC), comprising:
a foldable elongated flexible magnetized component (EFMC) configured to produce a persistent magnetic field wherein at least some portions of the foldable EFMC are magnetically attracted to at least some other portions of the foldable EFMC when the foldable EFMC is in a folded state, wherein:
the foldable EFMC includes a pliable polymer binder and magnetic particles distributed within the pliable polymer binder;
the foldable EFMC has a substantially rectangular cross-section defining a pair of substantially planar and parallel major surfaces;
one or more electrically conductive wires, wherein one or more of the electrically conductive wires are embedded in the foldable EFMC.

10. A method of manufacturing a foldable magnetic cable (FMC), the method comprising:
forming a foldable elongated flexible magnetic component (EFMC) having a substantially rectangular cross-section defining a pair of substantially planar and parallel major surfaces; and;
exposing the foldable EFMC to a magnetic field of sufficient strength to create a persistent magnetic field wherein the persistent magnetic field is oriented wherein at least some portion of the foldable EFMC is magnetically attracted to at least some other portion of the foldable EFMC when the FMC cable is in a folded state; and
incorporating one or more electrically conductive wires within or adjacent to the foldable EFMC.

11. The method of claim 10, further comprising exposing the foldable EFMC to a magnetic field in the folded state to create alternating sections of polarity.

12. The method of claim 10, further comprising heat treatment to impart a desired shape to the cable and installing a connector at each end of the foldable EFMC.

13. A method of manufacturing a foldable magnetized cable (FMC), the method comprising:
compounding a polymer and magnetic particles to form a foldable elongated flexible magnetic component (EFMC) having a substantially rectangular cross-section defining a pair of substantially planar and parallel major surfaces; and;
cutting the foldable EFMC to a desired length;
magnetizing the foldable EFMC with a strong magnetic field; and
installing a connector at each end of the foldable EFMC.

14. The method of claim 13, further comprising extruding the foldable EFMC over one or more electrically conductive wires.

15. The method of claim 13, further comprising routing wires alongside the foldable EFMC.

16. The method of claim 13, further comprising optionally stiffening one or more sections of the foldable EFMC.

* * * * *